United States Patent Office 3,409,641
Patented Nov. 5, 1968

3,409,641
NITROGEN CONTAINING STEROIDS
Milton Heller and Seymour Bernstein, New City, N.Y., assignors to American Cyanamid Company, Stamford, Conn., a corporation of Maine
No Drawing. Filed May 16, 1966, Ser. No. 550,174
10 Claims. (Cl. 260—397.4)

This invention relates to new steroid compounds. More particularly, it relates to 16,17-substituted pregnenes.

The novel pregnenes of the present invention may be illustrated by the following formula:

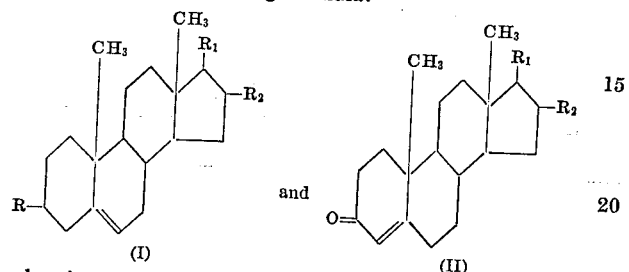

wherein R is selected from the group consisting of hydroxy, lower alkanoyloxy, formyloxy and $$CH_3CH_2O\overset{O}{\underset{\|}{C}}-O-$$

$R_1$ is selected from the group consisting of $$HO\overset{CH_3}{\underset{|}{C}H}$$

and lower alkanoyl

and $R_2$ is selected from the group consisting of

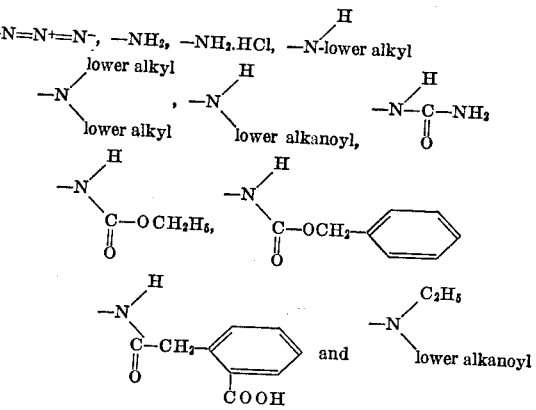

The present compounds are substantially insoluble in water and soluble in the usual organic solvents such as, for example, lower alkanols, ether, chloroform, acetone, hexane, etc.

The compounds of the present invention are prepared by starting with 3β-acetoxy-16α-hydroxypregn-5-en-20-one which in turn is described by Cole et al., J. Org. Chem. 19, 131 (1954). The following flowsheet shows the preparation of the present compounds

FLOWSHEET

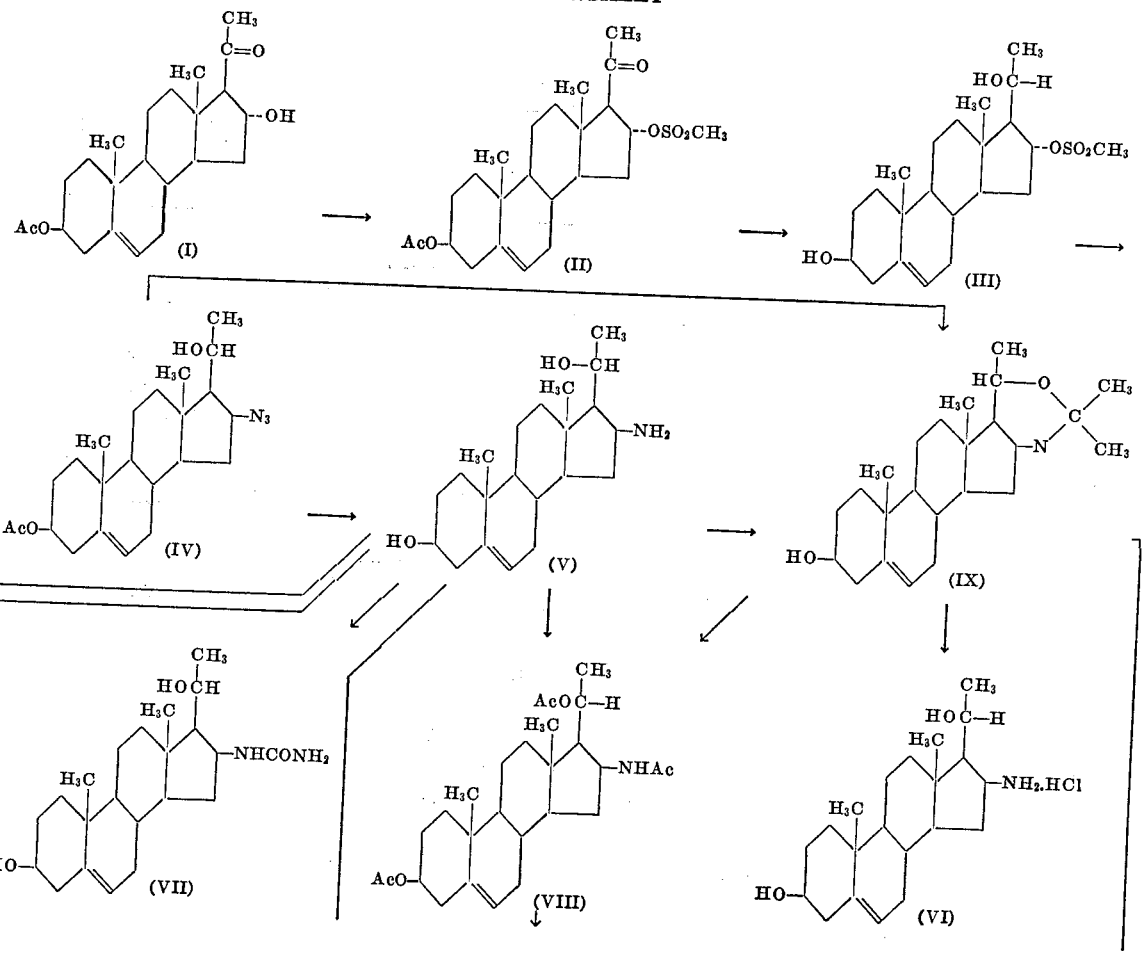

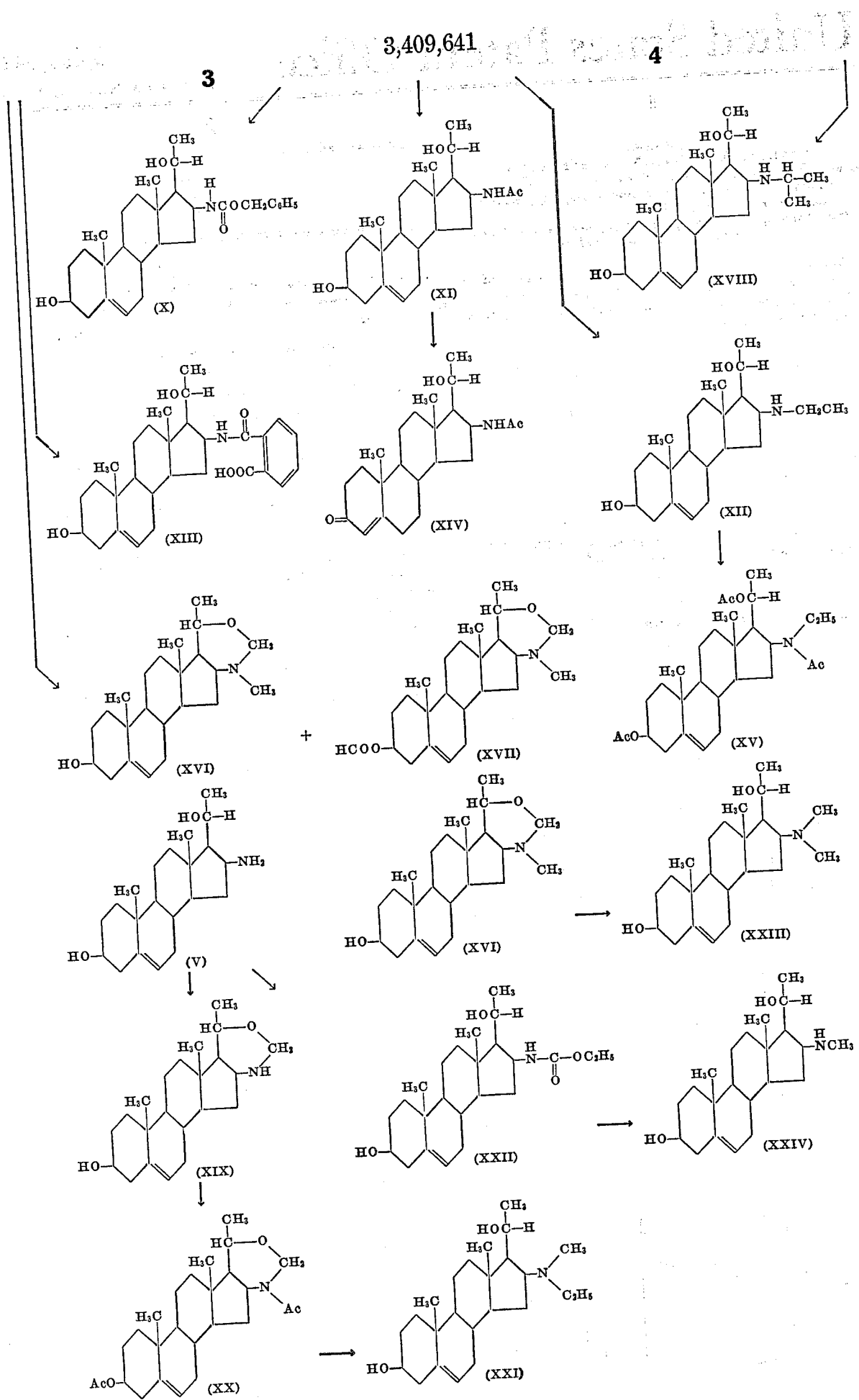
wherein Ac is lower alkanoyl.

In the above flowsheet 3β-acetoxy-16α-hydroxypregn-5-en-20-one (I) is reacted with methanesulfonyl chloride in the presence of pyridine to produce the corresponding methanesulfonate compound (II). The latter on treatment with an alkali metal borohydride in the presence of an absolute lower alkanol produces 3β-acetoxy-16α-methanesulfonyloxypregn-5-en-20β-ol (III). When the 20β-ol is treated with sodium azide in the presence of N-methyl-2-pyrrolidone and a lower alkyl alcohol, the product 3β-acetoxy-16β-azidopregn-5-en-20β-ol (IV) is obtained. When compound (IV) is heated with lithium aluminum hydride in a solvent, 16β-aminopregn-5-en-3β,20β-diol (V) is obtained. When the latter compound is recrystallized from acetone or acetone-petroleum ether, 2',2',6'(R)-trimethyl - 2'3',4',5' - tetrahydro - 1',3' - oxazino [4',5':16β,17β]androst-5-en-3β-ol (IX) is obtained. When the latter compound is treated with acetic anhydride in the presence of pyridine, 16β-acetamidopregn-5-ene-3β,20β-diol diacetate (VIII) is obtained. Treating the trimethyl 1,3-oxazine (IX) with hydrogen chloride in methylene chloride produces 16β-aminopregn-5-ene-3β, 20β-diol hydrochloride (VI). Heating the N-acetyl 3,20-diacetate (VIII) with potassium carbonate in the presence of a lower alkanol produces 16β-acetamidopregn-5-ene-3β,20β-diol (XI). The latter compound when heated with aluminum isopropoxide in a solvent, produces 16β-acetamido-20β-hydroxypregn-4-ene-3-one (XIV). The amino-diol (V) is heated with nitrourea in the presence of a lower alkanol to produce 16β-carbamido pregn-5-ene-3β,20β-diol (VII). The 16β-amino-3,20-diol (V) when treated with carbobenzoxy chloride in the presence of pyridine, produces N-carbobenzoxy-3β,20β-dihydroxy-pregn-5-en-16β-yl-amine (X). The 16β-amino 3,20-diol (V) when heated with phthalic anhydride in the presence of dioxane, produces 16β-(o-carboxybenzamido)pregn-5-ene-3β,20β-diol (XIII). Heating 16β-aminopregn-5-ene-3β,20β-idol (V) with formic acid and formaldehyde produces 3',6'(R) - dimethyl - 2',3',4',5' - tetrahydro - 1',3'-oxazinol[4',5':16β,17β]androst-5-en-3β-ol (XVI) and also the formate ester (XVII). Also, when compound (V) is heated with formaldehyde in the presence of a lower alkanol, 6'(R)-methyl-2',3',4',5'-tetrahydro-1',3'-oxazino-[4',5':16β,17β]androst-5-ene-3β-ol (XIX) is produced. The latter compound when reacted with acetic anhydride in pyridine, produces 3'-acetyl-6'-(R)methyl-2'-3',4',5'-tetrahydro - 1',3' - oxazino[4',5':16β,17β]androst - 5 - en-3β-ol acetate (XX). The reaction of 16β-aminopregn-5-ene-3β,20β-diol (V) in pyridine with ethyl chloroformate produces N-carbethoxy-3β,20β-dihydroxypregn-5-en-16β-yl-amine (XXII). The latter compound heated with lithium aluminum hydride in the presence of the tetrahydrofuran produces 16β-methylaminopregn-5-ene-3β,20β-diol (XXIV). The N-acetyl diacetate (VIII) heated with lithium aluminum hydride in the presence of tetrahydrofuran gives 16β - ethylaminopregn - 5 - ene-3β,20β-diol (XII). When the N-methyl oxazine (XVI) is heated with lithium aluminum hydride in tetrahydrofuran, the product 16β - dimethylaminopregn - 5 - en - 3β,20β - diol (XXIII) is obtained. Further when the N-acetyl oxazine (XX) is heated with lithium aluminum hydride in tetrahydrofuran, the product 16β-ethylmethylaminopregn-5-ene-3β,20β-diol (XXI) is obtained. Still further, when the trimethyl-1,3-oxazine (IX) is heated with lithium aluminum hydride in a solvent, the product 16β-isopropylamino-pregn-5-ene-3β,20β-diol(XVIII) is obtained. When the 16β - ethylamine - 3β,20β - diol (XII) is reacted with acetic anhydride in the presence of pyridine the product N-acetyl-16β-ethylaminopregn-5-ene-3β,20β-diol diacetate (XV) is obtained.

The compounds of the present invention possess antibacterial and anti-fungal properties and are therefore useful in the treatment of conditions resulting from the presence of bacteria and fungi.

The following examples illustrate in detail the preparation of representative 16,17-substituted pregnenes of this invention.

Example 1.—Preparation of 3β-acetoxy-16α-methanesulfonyloxypregn-5-en-20-one (II)

Treatment of a solution containing 1 g. of 3β-acetoxy-16α-hydroxypregn-5-en-20-one, (I), [prepared according to J. Org. Chem. 19, 131 (1954)], in 5 ml. of pyridine with methanesulfonyl chloride (2 ml.) at −5° C. gives, after crystallization of the product from an acetone-water mixture, the corresponding mesylate compound, (II): 1.005 g.; melting point 153–155° C. An analytic sample melts at 159.5–160.5° C.; $[\alpha]_D^{25}$ −29° (chloroform);

$$\nu_{max}^{KBr} 1742$$

1710, 1361, 1248 and 1182 cm.$^{-1}$.

Example 2.—Preparation of 3β-acetoxy-16α-methanesulfonyloxypregn-5-en-20β-ol (III)

A mixture of 5.2 g. of the methanesulfonate-20-one (product of Example 1) and 5.0 g. of sodium borohydride in absolute ethanol (780 ml.) is stirred at room temperature for 75 minutes, whereupon complete solution is effected. The solution is added to ice-water and the resultant precipitate (3.48 g.) crystallized from dilute methanol to give 3β-acetoxy-16α-methanesulfonyloxypregn-5-en-20β-ol, melting point 158.5–159° C. Crystallization from a mixture of acetone-hexane gives an analytical sample: melting point 161.5–162° C.; $[\alpha]_D^{25}$ −110° (chloroform);

$$\nu_{max}^{KBr} 3502$$

1739, 1342, 1260 and 1178.

Example 3.—Preparation of 3β-acetoxy-16β-azidopregn-5-en-20β-ol (IV)

A mixture of the methanesulfonate compound, (III), (0.57 g.) (product of Example 2) and sodium azide (0.45 g.) in 23.75 ml. of N-methyl-2-pyrrolidone and 1.25 ml. of t-butyl alcohol is heated on the steam bath for 28 hours. Water is added and the resultant amorphous brown solid (0.495 g.) is collected. Crystallization from a mixture of acetone-petroleum ether (boiling range 60–70° C.) yields (IV), (0.215 g.) melting point 173–179° C. An analytical sample is obtained from acetone-water, melting point 186.5–187° C.; $[\alpha]_D^{25}$ + 19° (chloroform);

$$\nu_{max}^{KBr} 3580$$

2150, 1738 and 1260 cm.$^{-1}$.

Example 4.—Preparation of 16β-aminopregn-5-ene-3β,20β-diol (V)

A slurry of the 16β-azido-compound, (IV), (3.73 g.) (product of Example 3) and lithium aluminum hydride (5.0 g.) in 200 ml. of ether is refluxed for 16 hours. The excess hydride is cautiously reacted with a saturated solution of potassium and sodium tartrate. The mixture is filtered and the residue boiled in ethyl acetate. When the ethyl acetate filtrate from the residue is combined with the above ether filtrate, a precipitate, (V), (1.475 g.) appears and is collected, melting point 238–242° C. An analytical sample is crystallized from ethyl acetate, melting point 241–242° C.; $[\alpha]_D^{25}$ −51° (methanol);

$$\nu_{max}^{KBr} 3300$$

1605 and 1050 cm.$^{-1}$.

Example 5.—Preparation of 2',2',6'(R)-trimethyl-2',3', 4',5' - tetrahydro - 1',3'-oxazino[4',5':16β,17β]androst-5-en-3β-ol (IX)

Reduction of the 16β-azide, (IV), (1.09 g.) (product of Example 3) with lithium aluminum hydride (2.0 g.) in 100 ml. of ether, as in the preparation of the 16β-amine (V), but crystallizing the resultant solids from acetone-petroleum ether (boiling range 30–70° C.) gives (IX), (0.285 g.) melting point 165.5–167° C. An analytical sample is obtained by crystallization from acetone, melting point 176.5–178.5° C.; $[a]_D^{25}$ —8° (methanol).

The same compound, (IX), is also obtained directly by crystallization from the 16β-amine (V) from acetone.

Example 6.—Preparation of 16β-acetamidopregn-5-ene-3β,20β-diol diacetate (VIII)

A solution of the 1,3-oxazine, (IX), (0.18 g.) (product of Example 5) in 2 ml. of acetic anhydride and 5 ml. of pyridine is allowed to stand 18 hours at room temperature. The solution is poured into water and the resultant precipitate (0.22 g.) is collected. Crystallization from acetone-water gives (VIII), melting point 190–190.5° C.; $[a]_D^{25}$ —35° (methanol).

Acetylation of the 16β-amine, (V), (product of Example 4) in the same manner as above, gives 16β-acetamidopregn-5-ene-3β,20β-diol diacetate (VIII), melting point 185–186.5° C. The infrared spectrum is identical to the above product.

Example 7.—Preparation of 16β-aminopregn-5-ene-3β,20β-diol hydrochloride (VI)

Gaseous hydrogen chloride is added to a solution of the 1,3-oxazine, (IX), (0.22 g.) the product of Example 5, in 10 ml. of methylene chloride for 30 seconds at room temperature. The solvent is removed under reduced pressure and crystallization from acetone gives a solid (0.135 g.), melting point about 210° C. Repeated recrystallization from methanol-ether gives (VI), melting point 331.5–332° C. (dec.); $[a]_D^{25}$ —37° (methanol);

$\nu_{max}^{KBr}$ 3340

1606 and 1050 cm.$^{-1}$.

Example 8.—Preparation of 16β-acetamidopregn-5-ene-3β,20β-diol (XI)

To a solution of the N-acetyl 3,20-diacetate, (VIII), (2.3 g.) (product of Example 6) in 100 ml. methanol is added 20 ml. of 10% potassium carbonate and the resultant solution is refluxed. Complete reaction does not take place until two hours elapses according to infrared spectrum determination. Pouring the refluxed solution into a large excess of water and crystallizing from dilute methanol gives (XI), 1.7 g., melting point 281.5–282.5° C. The analytical sample melted at 283–284° C; $[a]_D^{25}$ —27° (methanol).

Example 9.—Preparation of 16β-acetamido-20β-hydroxypregn-4-ene-3-one (XIV)

A mixture of the N-acetyl-3β,20β-diol (XI), (0.6 g.) (product of Example 8) in 150 ml. of toluene and 8 ml. of cyclohexanone is distilled until about 50 ml. of solvent is removed. An aluminum isopropoxide solution (0.06 g./ml.) in 10 ml. of toluene is added and the mixture is refluxed for 18 hours. A saturated solution of potassium and sodium tartrate (50 ml.) is added to the refluxed solution and the resultant mixture stream distilled until all the cyclohexanone is removed. The solids (0.22 g.) are filtered. The residue is heated in acetone and the remaining residue (0.074 g.) which is starting material, is collected. The material in the filtrate (0.217 g.) is put on an activated magnesium silicate column (40 g.). Collection of the eluates from petroleum ether (boiling range 30–60° C.):acetone (1:1) yields 0.12 g. of a glass. Crystallization from a mixture of acetone and hexane gives 0.048 g. of (XIV): melting point 262–263° C.; $[a]_D^{25}$ +49° (methanol);

$\nu_{max}^{MeOH}$ 251 mμ (ε13,900).

Example 10.—Preparation of 16β-carbamidopregn-5-ene-3β,20β-diol (VII)

A solution of the amino-diol, (V), (1.0 g.) (product of Example 4) and nitrourea (0.364 g.) in 20 ml. of 95% ethanol is refluxed 15 minutes whereupon a copious precipitate is formed. This precipitate is collected to yield 0.66 g. (VII) melting point 251–252° C.; $[a]_D^{25}$ —22° (methanol). Crystallization from methanol does not improve the melting point.

Example 11.—Preparation of N-carbobenzoxy-3β,20β-dihydroxypregn-5-en-16β-yl-amine (X)

To a solution of 16β-aminopregn-5-ene-3β,20β-diol, (V), (1.0 g.) (product of Example 4) in 20 ml. of pyridine is added 1.0 ml. of carbobenzoxy chloride at 0° C. The mixture is allowed to stand at this temperature for one-half hour and then at room temperature for one hour. The mixture is then poured into ice-water and the resultant precipitate (0.14 g.) collected. Crystallization gives 0.21 g. of crude (X), melting point 148–156° C. which could not be further purified as indicated by thin layer chromatography (T.L.C). A 70 mg. portion of this crude sample is placed on a T.L.C. plate (silica gel, 20 cm. x 20 cm. x 0.5 mm.) and developed for 2 hours in the system benzene:acetone:water (2:1:2) (upper phase). The band containing the product (about 2.5 to 3.0 cm. from the origin) is eluted with acetone and the product is crystallized as a solvated material: 0.046 g.; melting point 164.5–165.5° C.;

$\nu_{max}^{KBr}$ 1505 and 1695 cm.$^{-1}$

Example 12.—Preparation of 16β(o-carboxybenzamide)-pregn-5-ene-3β,20β-diol (XIII)

A solution of 16β-aminopregn-5-ene-3β,20β-diol, (V), (1.0 g.) (product of Example 4) and 0.5 g. of phthalic anhydride in 100 ml. of dioxane is refluxed for 26 hours. The solvent is removed under reduced pressure and the residue crystallized from dilute methanol to give the hydroscopic product: 0.35 g.; melting point 188–190° C. (bubbles). An additional 0.44 g. of product is collected as a post-precipitate: $[a]_D^{25}$ —24.5° (methanol);

$\nu_{max}^{KBr}$ 1709 and 1640 cm.$^{-1}$

Example 13.—Preparation of 3',6'(R)-dimethyl-2',3',4',5'-tetrahydro-1',3'-oxazino[4',5':16β,17β]androst-5-en-3β-ol (XVI) and 3',6'(R)-dimethyl-2',3',4',5'-tetrahydro-1',3'-oxazino[4',5':16β,17β]androst-5-en-3β-ol formate (XVII)

A mixture of 16β-aminopregn-5-ene-3β,20β-diol, (V), (2.125 g.) (product of Example 4) formic acid (30 ml.) and 40% formaldehyde (30 ml.) is refluxed for 4 hours and then poured into ice-water. The water solution is extracted with ether, then made basic with concentrated potassium hydroxide. The precipitate is collected. Crystallization from acetone-water and a recrystallization from acetone-hexane affords 0.41 g. of (XVI), melting point 186°–188° C.; $[a]_D^{25}$ —33° (chloroform).

Crystallization of the mother liquors from methanol-water gives 0.196 g. of the formate ester, (XVII), melting point 156–159° C.; $[a]_D^{25}$ —55.5° (chloroform).

Example 14.—Preparation of 6'(R)-methyl-2',3',3',4'-tetrahydro-1',3'-oxazino[4',5':16β,17β-androst-5-en-3β-ol (XIX)

A solution of 16β-aminopregn-5-ene-3β,20β-diol (V) (0.5 g.) (product of Example 4) in 40% formaldehyde (25 ml.) and methanol (25 ml.) is refluxed for 1½ hours. The methanol is removed under reduced pressure and the precipitate which formed is collected. Crystallization from a mixture of methylene chloride, methanol and ether gives 0.235 g. of (XIX), melting point 252–255° C. An analytical sample melts at 264–266° C.

Example 15.—Preparation of 3'-acetyl-6'(R)-methyl-2',3',4',5'-tetrahydro-1',3'-oxazino[4',5':16β,17β] androst-5-en-3β-ol acetate (XX)

A mixture of 6'(R)-methyl-2',3',4',5'-tetrahydro-1',3'-oxazino[4',5':16β,17β]androst-5-en-3β-ol (XIX) (0.134 g.) (product of Example 14) in chloroform (4 ml.), pyridine (4 ml.), and acetic anhydride (2 ml.) is heated on a steam bath until solution is effected, about 15 minutes. The solution is left to stand at room temperature for 20 hours, after which time it is poured into water and the resultant solid is collected and put on an activated magnesium silicate column (25 g.). Elution with petroleum ether (30–60° C.):acetone (43.2) gives a solid which crystallizes from acetone-hexane to yield 0.10 g. of (XX), melting point 216–219° C. An analytical sample melts at 224.5–226° C.; $[a]_D^{25}$ −53.5° (chloroform).

Example 16.—Preparation of N-carbethoxy-3β,20β-dihydroxypregn-5-en-16β-yl-amine (XXIII)

To an ice cold solution of 16β-aminopregn-5-ene-3β,20β-diol (V) (1.0 g.) the product of Example 4, in pyridine (20 ml.) is added ethyl chloroformate (0.268 g.). The mixture is allowed to stand at ice temperature for ½ hour, and then at room temperature for one hour. The mixture is poured into ice-water and the resultant precipitate is collected and crystallized from dilute methanol to give 0.955 g. of (V), melting point 191–195° C. An analytical sample is crystallized from acetone-hexane and melts at 197–198.5° C.; $[a]_D^{25}$ −35° (chloroform).

Example 17.—Preparation of 16β-methylaminopregn-5-ene-3β,20β-diol (XXIV)

A mixture of the N-carbethoxy-diol (XXII) (0.533 g.) (product of Example 16) and lithium aluminum hydride (0.5 g.) in 50 ml. tetrahydrofuran is stirred and refluxed for 4 hours. The resultant mixture is worked up as in the preparation of the 16-ethylamino compound (XII) (product of Example 18) to give, after crystallization from methanol-water, 0.43 g. of the crude product (XXIV), melting point 194.5–198° C. An analytical sample crystallized from aectone-hexane melts at 216–217° C.; $[a]_D^{25}$ −17° (methanol).

Example 18.—Preparation of 16β-ethylaminopregn-5-ene-3β,20β-diol (XII)

A mixture of the N-acetyl diacetate (VIII) (1.6 g.) (product of Example 6) and lithium aluminum hydride (2.27 g.) in 150 ml. tetrahydrofuran is stirred and refluxed for 16 hours. A saturated solution of potassium and sodium tartrate is added to the refluxed mixture and the resultant mixture is filtered. The residue is stirred in methanol and filtered and the filtrates are combined and taken to dryness under reduced pressure. Crystallization from dilute acetone followed by crystallization from acetone-hexane yields 0.72 g. of (XII), melting point 172.5–173° C. An analytical sample melts at 181.5–182.5° C.; $[a]_D^{25}$ −17° (methanol).

Example 19.—Preparation of 16β-dimethylaminopregn-5-ene-3β,20β-diol (XXIII)

A mixture of the N-methyl oxazine (XVI) (0.971 g.) (product of Example 13) and lithium aluminum hydride (1.0 g.) in tetrahydrofuran is stirred and refluxed for 24 hours. The mixture is worked up as in the preparation of the 16-ethylamino compound (XII) (product of Example 18) to give, after crystallization from dilute methanol, 0.583 g. of (XXIII), melting point 168–173° C. An analytical sample, crystallized from acetone-hexane melts at 180.5–182° C.; $[a]_D^{25}$ −23° (chloroform).

Example 20.—Preparation of 16β-ethylmethylaminopregn-5-ene-3β,20β-diol (XXI)

A mixture of the N-acetyl oxazine (XX) (1.242 g.) (product of Example 15) and lithium aluminum hydride (2.0 g.) in tetrahydrofuran is stirred and refluxed for 40 hours. The mixture is worked up as in the preparation of the 16-ethylamino compound (XII) (product of Example 18), to give, after crystallization from dilute methanol, 0.95 g. of (XXI), melting point about 178–183° C. The analytical sample, crystallized from acetone-hexane, melts at 178–180° C.; $[a]_D^{25}$ −39° (chloroform).

Example 21.—Preparation of 16β-isopropylaminepregn-5-ene-3β,20β-diol (XVIII)

A mixture of the trimethyl-1,3-oxazine (IX) (0.215 g.) (product of Example 5) and lithium aluminum hydride (0.4 g.) in 50 ml. of dry ether and 25 ml. of tetrahydrofuran is stirred and refluxed for 3 hours. The excess lithium aluminum hydride is destroyed with a saturated solution of potassium and sodium tartrate. The mixture is filtered and the residue is washed with ethyl acetate and acetone. The filtrates are combined, dried and the solvent removed under reduced pressure. Crystallization of the remaining residue gives 0.12 g. (XVIII), melting point about 160° C. An analytical sample melts at 169.5–170.5° C.; $[a]_D^{25}$ −24.5° (methanol).

Example 22.—Preparation of N-acetyl-16β-ethylamino-pregn-5-ene-3β,20β-diol diacetate (XV)

Treatment of the 16β-ethylamino-3β,20β-diol (XII) (0.347 g.) (product of Example 18) with 2.0 ml. of acetic anhydride in 5.0 ml. of pyridine at room temperature for 18 hours gives 0.33 g. of the N-acetyl diacetate (XV), melting point 208.5–210.5° C., upon pouring the solution into water and crystallizing the precipitate from acetone-water. An analytical sample melts at 211–212° C.; $[a]_D^{25}$ −70° (chloroform).

What we claim is:

1. A pregnene selected from the group consisting of the formulas:

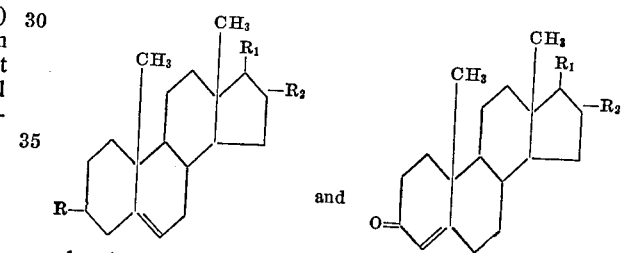

wherein R is selected from the group consisting of hydroxy, lower alkanoyloxy, formyloxy and $$CH_3CH_2O\overset{O}{\underset{\|}{C}}-O-$$

$R_1$ is selected from the group consisting of

and lower

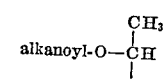

and $R_2$ is selected from the group consisting of —N=N+=N−, —NH$_2$, —NH$_2$.CHl,

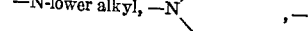

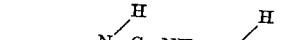

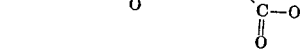

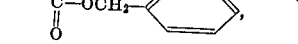

and

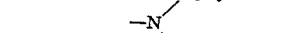

2. A pregnene according to claim 1, 16β-aminopregn-5-ene-3β,20β-diol.

3. A pregnene according to claim 1, 16β-acetamido-pregn-5-ene-3β,20β-diol diacetate.

4. A pregnene according to claim 1, 16β-acetamido-20β-hydroxypregn-4-ene-3-one.

5. A pregnene according to claim 1, 16β-carbamido-pregn-5-ene-3β,20β-diol.

6. A pregnene according to claim 1, 16β-o-carboxy-benzamido)-pregn-5-ene-3β,20β-diol.

7. A pregnene according to claim 1, N-carbethoxy-3β, 20β-dihydroxypregn-5-en-16β-yl-amine.

8. A pregnene according to claim 1, 16β-dimethylamino-pregn-5-ene-3β,20β-diol.

9. A pregnene according to claim 1, 16β-methylamino pregn-5-ene-3β,20β-diol.

10. A pregnene according to claim 1, 16β-ethylmethyl-aminopregn-5-ene-3β,20β-diol.

References Cited

UNITED STATES PATENTS 3,232,930  2/1966  Bergstrom.

H. A. FRENCH, *Primary Examiner.*